Aug. 10, 1965  R. WAELTZ  3,199,564
CASTELLATED NUT
Filed Feb. 17, 1964
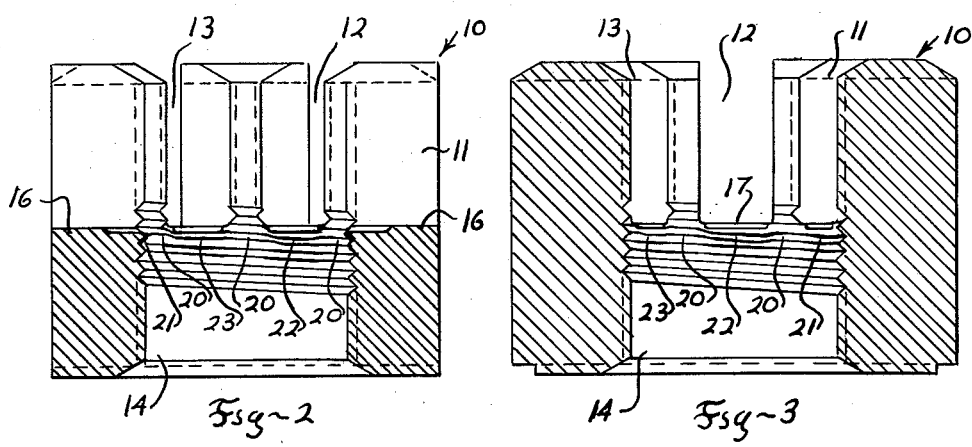
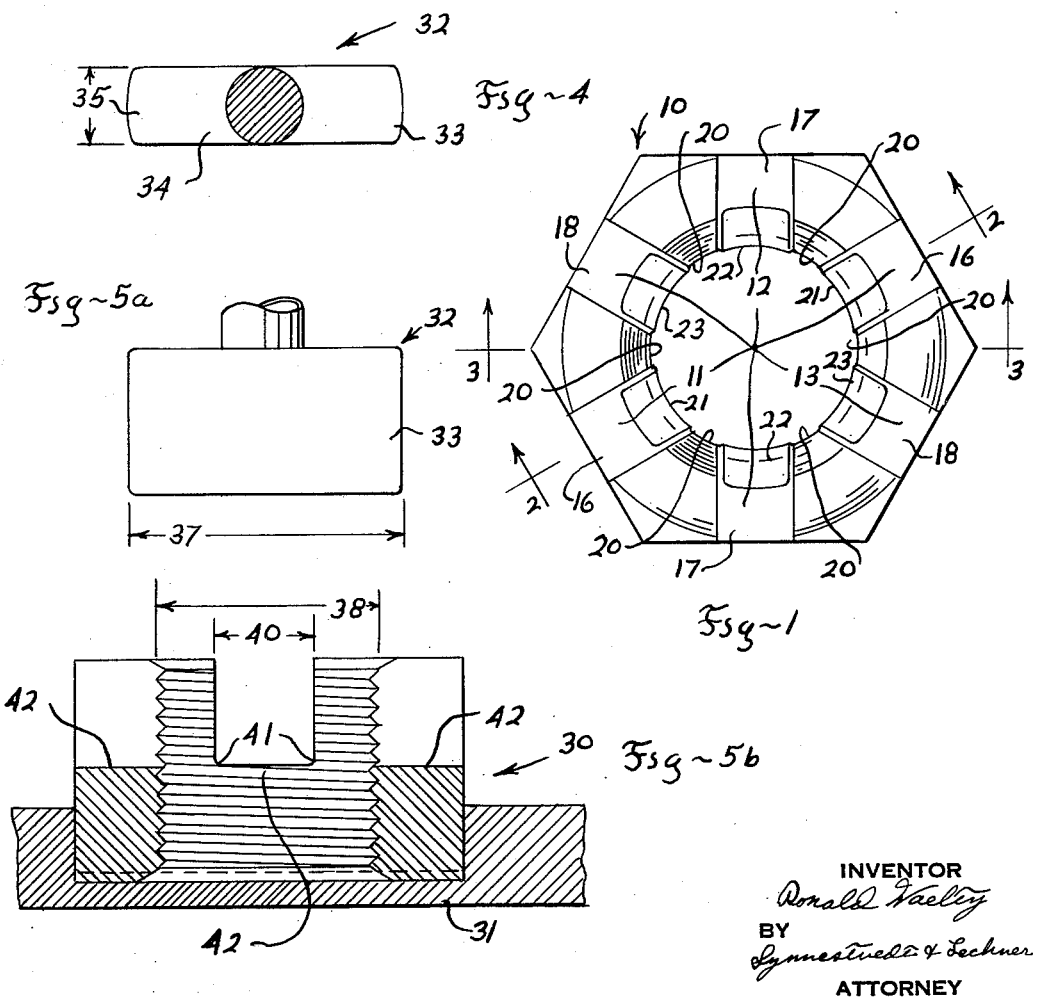
INVENTOR
Donald Waeltz
BY
Lynnestvedt & Lechner
ATTORNEY

United States Patent Office 3,199,564
Patented Aug. 10, 1965

3,199,564
CASTELLATED NUT
Ronald Waeltz, Hatboro, Pa., assignor to Standard Pressed Steel Co., Jenkintown, Pa., a corporation of Pennsylvania
Filed Feb. 17, 1964, Ser. No. 345,258
1 Claim. (Cl. 151—21)

This invention relates to a castellated nut and a method of making the same.

As used herein, the term "castellated nut" shall refer to any slotted or castle type nut intended to be used in combination with a cotter pin, safety wire or other keyed security device (hereinafter collectively referred to as the pin) that projects through a diametral hole in the associated bolt that is aligned with the slots of the nut.

Conventional castellated nuts rely solely on the pin to insure the security of the bolted assembly. However, on occasion, the pin is not installed or if installed, fails and thereafter vibration can cause loosening of the nut. Heretofore, castellated nuts have been provided with a non-metallic locking insert in the nut threads. Such devices cannot be employed at temperatures above 250° F. and they cannot be used more than once because the hole in the bolt for receiving the pin forms cutting edges at the threads. These cutting edges shave the non-metallic insert when the nut is installed and thereby virtually destroy its locking capabilities.

It is an object of this invention to provide a reusable self-locking castellated nut that can also be employed at elevated temperatures greatly in excess of 250° F.

These objects are achieved in accordance with this invention by staking a castellated nut in the slotted portions and employing a nut material having a hardness that will resist the cutting action of the cotter pin hole in the bolt—for example—a minimum hardness of Rockwell C–20. In the staking operation, the crest and flanks of the threads in those portions of the nut body lying generally in the plane of the bottom of at least one of the slots which form the castellations are displaced horizontally into the bore toward the nut axis and are also displaced vertically from the normal helix line.

Additional objects and advantages will become apparent in the ensuing detailed description and drawings in which—

FIG. 1 is a plan view of a castellated nut made according to the invention.

FIG. 2 is a sectional elevation of the nut of FIG. 1 along line 2—2.

FIG. 3 is a sectional elevation of the nut of FIG. 1 along line 3—3.

FIG. 4 is a plan view of a staking tool for displacing the threads in accordance with this invention.

FIG. 5a is a side elevation of the tool of FIG. 4.

FIG. 5b illustrates a castellated square headed nut positioned in a jig aligned with the staking tool of FIG. 5a.

Referring to FIGS. 1, 2 and 3 of the drawing, the nut 10 has a series of slots 11, 12 and 13 formed in the crown of the nut and extending diametrically across the threaded bore 14 of the nut. The crests and flanks of the threads 15 in the general vicinity of the slot bottoms 16, 17 and 18 are displaced both horizontally and vertically. As can be seen in FIG. 1, the normal helix line of the thread crest is designated by reference numeral 20. However, in the vicinity of the slot bottoms 16, 17 and 18 the thread crests 21, 22, 23 have been horizontally displaced from the normal pitch line into the bore of the nut thereby slightly reducing the pitch diameter of the nut in those portions. Further, as can be seen in FIGS. 2 and 3 the threads 21, 22 and 23 in the vicinity of the slot bottoms are also displaced vertically from the normal helix line 20. In most instances portions of several of the threads below the slot bottom are displaced. Effective locking can be obtained by merely displacing the threads in the general vicinity of one of the slot bottoms and on one side only of the slot. However, it is preferred to effect displacement at symmetrically disposed points on the circumference, as such arrangement gives a more uniformly functioning lock.

The number of threads displaced, the extent to which they are displaced and the number of circumferential points at which threads are displaced can be varied as necessary to provide a desired degree of locking.

However, the deflection either horizontally or vertically should not be so great as to create a drag on the flanks of the bolt thread that will score or gall the threads.

The staking operation whereby the threads are deflected is generally illustrated in FIGS. 5a and 5b. In these figures, the nut 30 is shown as a square headed castellated nut in order to simplify the presentation. The unstaked nut 30 is positioned in a jig 31 that is axially aligned with a staking tool or punch 32 and with a slot presented toward the tool and aligned to receive a punch having one or more webs (up to the number of slots in the nut to be processed) adapted to deflect material at the slot bottoms. The illustrated tool includes a pair of webs 33 and 34 that are adapted to be introduced into one of the diametral slots of the nut. Where a staking tool having webs extending diametrically across the threaded bore of the nut is employed, the diameter (37) of the tool should be slightly greater than the major diameter of the nut thread. If the diameter (37) of the tool is less than the nut thread major diameter, the threads usually will be over deflected and drag on the bolt threads to an undesirable degree. In the case of a single web punch, the staking surface should be dimensioned and aligned to stake a slot bottom to the same extent as when a punch having diametrically disposed webs is employed. Preferably, the edges and corners of the tool that are to engage the slot bottom are rounuded to minimize setting up undesirable stresses in the nut. Further, in this connection, the thickness (35) of the punch web should be somewhat less than the width (40) of the slot in order to avoid setting up stresses at the corners 41 at the slot bottoms when the portions of the threads below the slot are deflected by the staking tool. In most instances, the tool-slot clearance should be of the general order of 0.020" are sufficient to avoid objectionably stressing the nut at corners 41.

The punch 32 can be operated by any suitable mechanism capable of developing the pressures needed to displace the material at the slot bottoms to form the locking feature by pressing the tool against slot portions designated 42. When using a punch of the type illustrated in FIG. 4, after the slot bottoms of a given diametral slot have been staked, the tool is retracted. If deflection at still other points on the bore circumference is desired, the tool can be realigned with another diametral slot and the bottoms of that slot can be staked in the same manner.

Conventional castellated nuts are not heat treated because they have sufficient hardness without being heat treated to exceed the minimum desired mechanical properties needed in normal application.

If a conventional castellated nut was staked to deflect the threads and provide a locking feature, the cutting edges on the bolt threads at the hole for the cotter pin will cut the nut threads and thereby impair the locking capabilities even after a single installation.

For example, where a 1/4–28 non-heat treated C1118 steel castellated nut staked as aforesaid was used for five installations, the locking capabilities were reduced to the minimum torquing requirements of MIL-N-25027. However, where the staked castellated nut had a hardness of Rockwell C-20 the locking capabilities after five installations and removals still significantly exceeded the minimum torque requirements of MIL-N-25027.

Further, the staked and heat hardened castellated nut was uniformly able to pass a one hour vibration test according to MIL-N-25027 whereas the unhardened but staked nuts could not uniformly meet this requirement.

In accordance with this invention, the staking can be applied to a nut already having the desired hardness, or after staking, the nut can be heat treated to harden it. The exact degree of hardness will vary somewhat with the particular usage to which the nut is to be subjected. However, for most purposes, it has been found that the integrity of the lock will be maintained at a high level over at least five installation cycles, if the nut has a hardness of at least Rockwell C-20.

Staked castellated nuts made in accordance with this invention can be used with cadmium plated bolts and will not scrape or gall the plating. In cases where we have attempted to apply a locking feature to a nut by squeezing the castles, the nuts could not be used on plated bolts because they scraped the plating to an objectionable degree.

I claim:

A self-locking castellated nut having a minimum hardness of Rockwell C-20 and characterized in that the crest and flank of the thread in those portions of the nut body lying generally in the plane of the bottom of at least one of the slots is displaced horizontally into the bore and vertically from the normal helix line of the thread, the displaced portion of the slot bottom extending outwardly from the nut bore to a locus outboard of the major diameter of the nut thread, the width of the displaced portion of the slot bottom being less than the width of the slot and wherein the castellated portion of the nut is threaded with threads having a uniform major and minor diameter which is the same as that of the normal threads in the non-castellated body portion of the nut.

References Cited by the Examiner

UNITED STATES PATENTS

| | | |
|---|---|---|
| 2,280,821 | 4/42 | Gray. |
| 2,352,668 | 7/44 | Tripp. |
| 2,816,591 | 12/57 | Reiner. |
| 3,129,742 | 4/64 | Faroni et al. _____ 151—5 |

EDWARD C. ALLEN, *Primary Examiner.*